United States Patent [19]

Ichiyanagi

[11] 4,304,481
[45] Dec. 8, 1981

[54] MOTOR DRIVEN CAMERA AND FILM WINDING APPARATUS THEREFOR

[75] Inventor: Toshikazu Ichiyanagi, Mitaka, Japan

[73] Assignee: Canon Kabushiki Kaisha, Tokyo, Japan

[21] Appl. No.: 143,102

[22] Filed: Apr. 23, 1980

[30] Foreign Application Priority Data

Apr. 27, 1979 [JP] Japan .................................. 54-52420

[51] Int. Cl.³ ............................................. G03B 1/00
[52] U.S. Cl. .................................. 354/173; 354/213; 352/158
[58] Field of Search ............... 354/173, 171, 170, 212, 354/213; 352/158

[56] References Cited

U.S. PATENT DOCUMENTS 4,141,635  2/1979  Asano .................................. 354/173

*Primary Examiner*—Joseph W. Hartary
*Assistant Examiner*—S. D. Schreyer
*Attorney, Agent, or Firm*—Toren, McGeady & Stanger

[57] ABSTRACT

In the camera and film winding apparatus disclosed, a motor is adapted to wind the film and a driving arrangement supplies the motor with a first signal to drive the motor so that the film is wound at a normal speed between frames, but at a lower speed than at the normal speed from the film loading position to the photographic start position.

6 Claims, 4 Drawing Figures

MOTOR DRIVEN CAMERA AND FILM WINDING APPARATUS THEREFOR

BACKGROUND OF THE INVENTION

This invention relates to a motor driven camera and, particularly, to one which winds film, rewinds film, and carries out exposure operations in response to a motor operated by a motor drive device.

Motor driven still cameras utilize a built-in motor drive or an externally mounted motor drive to actuate various camera functions, such as a film winding operation, a rewinding operation, a shutter cocking operation, and the like.

In such cameras, when a motor automatically winds the film from its loaded position to its start position at the first frame, the film is often damaged, so that the operator frequently winds these first two or three film frames manually with the winding lever. However, cameras with built-in motor drives are without winding levers so that it is impossible to advance the film manually. This results in the aforementioned type of damage.

SUMMARY OF THE INVENTION

An object of the present invention is to provide a motor drive device for the motor drive camera in which a motor is built-in, being capable of automatically winding up the above-mentioned portion of the film with sureness.

Another purpose of the present invention is to provide a motor drive device for the motor drive camera in which a motor is built-in, being capable of the film rewinding operation besides the above.

Further other objects of the present invention will be clear out of the explanations to be made below.

DESCRIPTION OF THE PREFERRED EMBODIMENTS

Below the present invention will be explained in detail in accordance with the accompanying drawings of the embodiments of the present invention.

Figure 1:
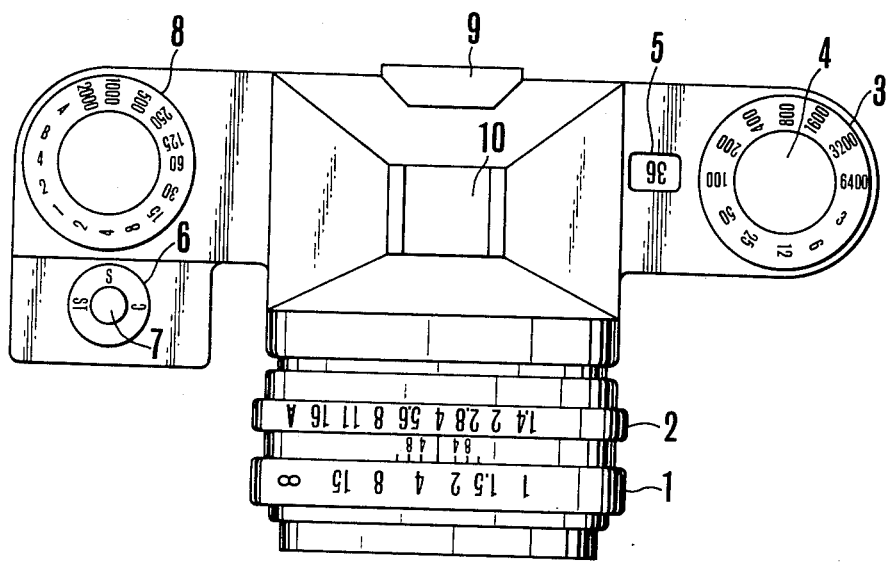
FIGS. 1 and 2 show a plane view and a front view of an embodiment of the motor drive camera in accordance with the present invention.
Figure 2:
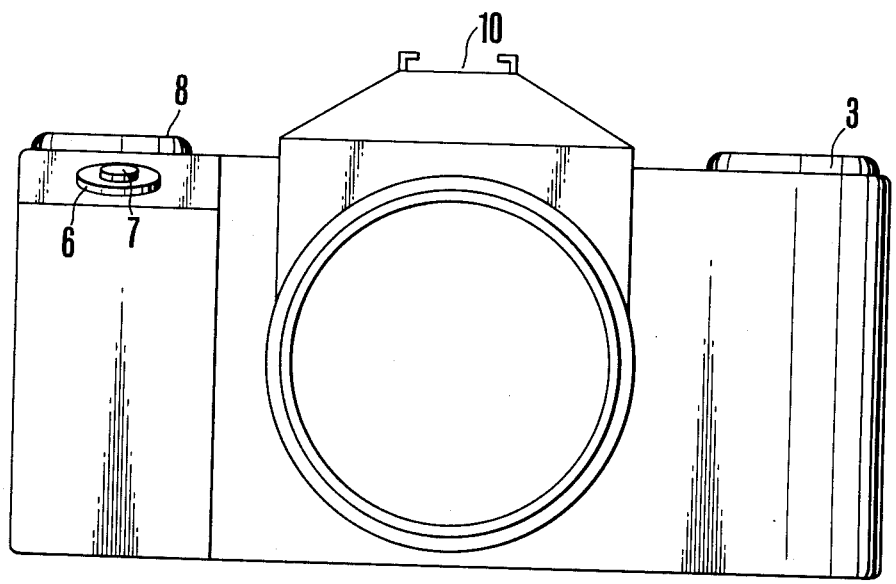

FIGS. 1 and 2 show a plane view and a front view of an embodiment of the motor drive camera in accordance with the present invention, whereby the arrangement of the important operation members is shown. In the drawing, 1 is the distance setting ring and 2 is the aperture setting ring, whereby both of them are arranged in the conventional interchangeable lens barrel. 3 is the ASA sensitivity setting ring while 4 is the operation member of the back cover opening and closing mechanism. 5 is the film frame counter window, 6 is the photographing mode change over dial and 7 is the shutter button arranged coaxially with the dial 6. 8 is the shutter time setting dial. 9 is the view finder eye piece, while 10 is the accessory shoe. Although FIGS. 1 and 2 show a camera in which the driving motor is built-in, the present invention can also be applied to the motor drive device which is mounted on the camera.

Figure 3:
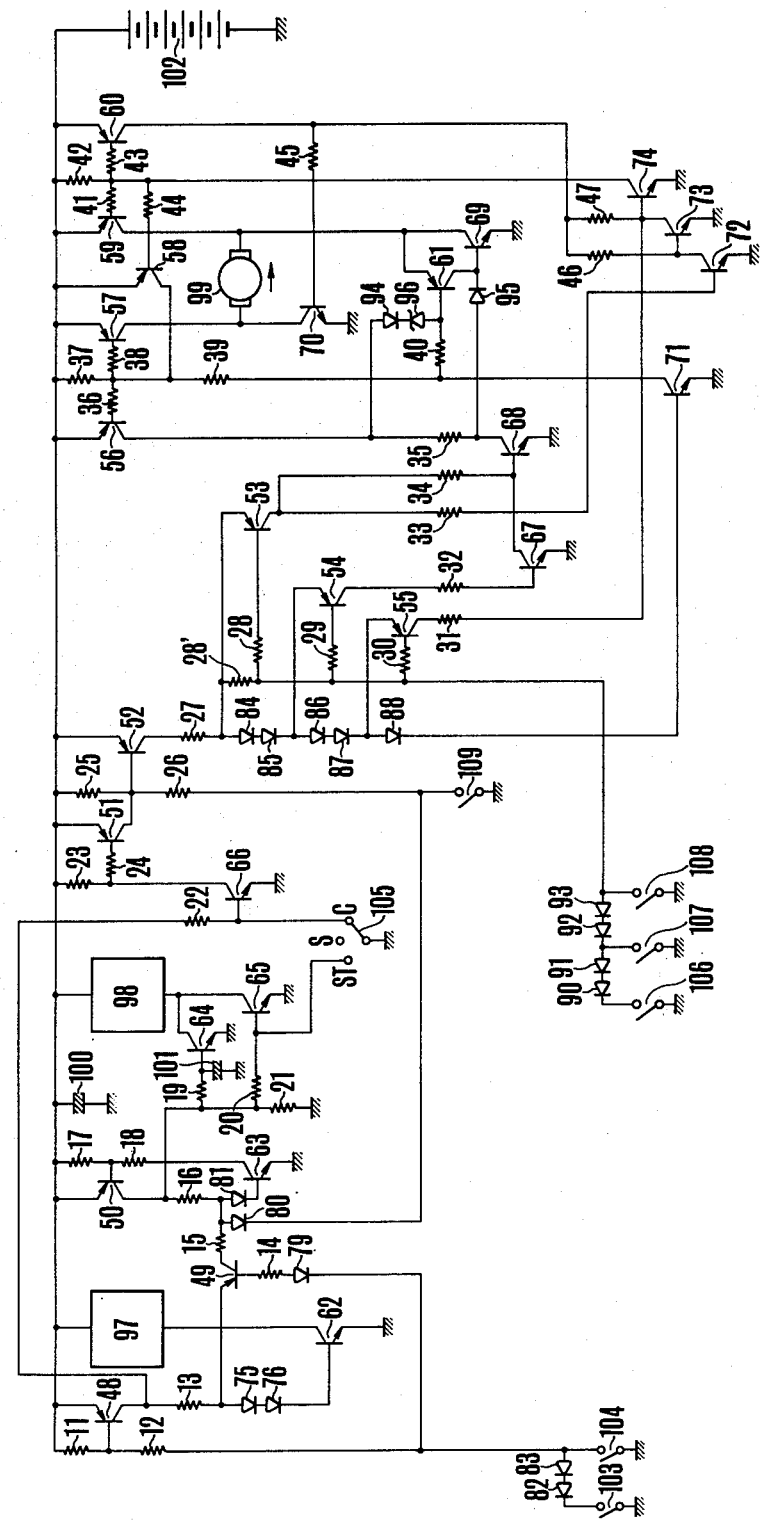
FIG. 3 shows an embodiment of the electrical circuit of a motor drive camera in accordance with the present invention.

FIG. 3 shows a circuit diagram of an embodiment of the motor drive camera shown in FIGS. 1 and 2. In the drawing, 11–47 are the resistances, 48–61 are the PNP type transistors, 62–74 are the NPN type transistors, 75–95 are the diodes, 96 is the Zener diode, 97 is the light measuring circuit including a TTL light measuring element and 98 is the shutter time control circuit. 99 is the driving DC motor, 100 and 101 are the condensers and 102 is the battery. 103–109 are the switches, whereby 103 is the light measuring switch for actuating the light measuring circuit, while 104 is the release switch operating at the first stroke of the shutter button, whereby the switches 103 and 104 are connected in parallel through the diodes 82 and 83. 105 is the photographing mode change over switch, whereby when it is closed to C, the continuous photographing mode is selected, when it is closed to S, the one frame photographing mode is selected and when it is closed to ST, the self-timer photographing mode is selected. 106 is the film loading detection switch when a film has been loaded in the camera, 107 is the switch to be closed while the film frame counter counts a predetermined number (for example, 36, 24, 12 and so on) of the frames of the loaded film starting from the photographing start position (0), and 108 is the switch to be closed when the film is whole photographed. The switches 106, 107 and 108 are connected in parallel through the diodes 90 and 91 and the diodes 92 and 93.

Below the operation of the camera constructed as mentioned above will be explained in accordance with FIGS. 1 to 3. At first, the operation for winding up the film loaded in the camera up to the photographing start position by means of a motor. When a film has been loaded in the camera, the film loading detection switch 106 is closed. In this state, the switches 107 and 108 maintain an open state respectively. Along with the first stroke of the shutter button 7 shown in FIG. 1, the release switch 104 is closed. Hereby, a current from the power source 102 flows through the resistors 11 and 12 so as to render the transistor 48 conductive. Thus, a base current flows through the transistor 62 so as to render the transistor 62 conductive, whereby a power is supplied to the light measuring circuit 97, so as to bring the circuit 97 into the operative state.

Hereby, when the light measuring switch 103 is operated, a current flows through the diodes 82 and 83 so as to supply current to the light measuring circuit 97 in the same way as in the above mentioned case. When the switch 103 is closed while the switch 104 is opened, the emitter of the transistor 49 is at the potential of the diodes 75 and 76 with reference to the ground (standard potential), while the base of the transistor 49 is at the potential of the diodes 79, 82 and 83 so that when now the potential of one diode is supposed to be 0.6 V, the potential of the emitter of the transistor 49 is about 1.2 V (=0.6×2), while the potential of the base is about 1.8 V (=0.6×3) in such a manner that the transistor 49 is brought in the opened state. Further, when the release switch 104 is closed, the emitter potential of the transistor 49 is higher than the base potential so that the transistor 49 is brought into the switched on state. Thus, both of the transistors 50 and 63 constituting a latch circuit are brought into the switched on state, so that even if the release switch 104 is opened, the current supply to the circuit is maintained.

To this circuit, the condenser 100 is connected in parallel so that even if the power source is interrupted for a short time due to vibration and so on the current supply to the latch circuit is maintained. Along with the switching on of the latch circuit the transistor 65 is brought into the switched on state so as to bring the shutter control circuit 98 into the operative state.

In this state, the indication of the film counter is maintained either at the mark S showing the film start position or at the mark 0 showing the photographing start position so that the switches 107 and 108 are opened, while the switch 106 is closed. Consequently, the base potentials of the transistors 53, 54 and 55 are respectively the potentials of the diodes 90, 91, 92 and 93, namely about 2.4 V (=0.6×4), whereby when the transistor 52 becomes conductive by means of the operation to be explained later, the emitter potentials of the transistors 53, 54 and 55 are respectively 3 V, 1.8 V and 0.6 V because of the circuit of the transistor 52, the diodes 84–88 and the transistor 71, so that the transistor 53 becomes conductive, while the transistors 54 and 55 become non-conductive. Along with the switching on of the transistor 53 the transistor 68 is brought into the switched on state. Along with the switching on of the transistor 71 a current flows through the transistor 56, the resistor 35 and the transistor 68 in such a manner that the base potential of the transistor 61 is kept lower than the (+) potential of the power source by the Zener potential Vz+0.6 V by means of the Zener diode 96 and the diode 94. Consequently, when the difference between the emitter potential of the transistor 61 and the (+) potential of the power source is larger than Vz, the base current of the transistor 61 decreases, thus, the collector current of the transistor 69 decreases, so that the emitter potential of the transistor 61 rises, whereby the difference approaches Vz. In the same way, when the difference is smaller than Vz, the emitter potential of the transistor 61 lowers so that the difference aproaches Vz. Namely, by means of this circuit the difference between the emitter potential of the transistor 61 and the (+) potential of the power source is made equal to Vz, whereby the terminal voltage of the motor 99 becomes Vz so that the motor 99 rotates at a constant low speed. Along with the rotation of the motor 99 at this low speed, when the indication of the counter reaches the position 0 representing the photographing start, the switch 107 is closed.

Below the operation of each photographing mode at the normal rotation speed will be explained.

(1) In case the photographing mode change over switch is closed to C, namely the continuous photographing mode is selected, the transistors 66 as well as 51 are in the non-conductive state. When the shutter is operated, the switch 109 is closed so as to render the transistor 52 conductive. Hereby, the film has been wound up to the photographing start position, so that the switches 106 and 107 are closed, while the switch 108 is opened. Thus, the transistor 71 is rendered conductive, whereby the transistors 56, 57 and 69 in the driving circuit are rendered conductive, so as to supply current to the motor 99 along the direction of the arrow and start the winding up operation. Because in this state out of the transistors 53, 54 and 55, the transistors 53 and 54 are rendered conductive, the transistor 67 is rendered conductive, while the transistor 68 is rendered non-conductive, whereby the power source voltage is applied to the motor 99, which is not rotated at the above mentioned low speed but at the normal speed. Further, this operation is carried out continuously so long as the shutter release switch 104 is closed so as to operate the shutter and the switch 109 is closed, whereby the continuous photographing is carried out by means of the motor drive.

(2) In case the photographing mode change over switch 105 is closed to S, namely the one frame photographing mode is selected, the transistor 51 is rendered conductive after the transistor 66 has been brought into the switched on state. Consequently, even if the switch 109 is closed, the transistor 52 is rendered non-conductive, whereby the motor driving circuit is not actuated so that neither the shutter charge nor the winding up operation is carried out. When the shutter button is let to go alone out of this state, the switch 104 is opened and the transistors 48, 66 and 51 are rendered non-conductive so that the transistors 52 and 71 are rendered conductive in such a manner that in the same way as in the above mentioned case a current is supplied to the motor 99 along the direction of the arrow so as to carry out the winding up operation. In this way, the shutter charge and the winding up operation are carried out. After then, along with the opening of the shutter switch 109 the transistors 52 and 71 are rendered non-conductive so as to stop the operation.

(3) When the photographing change over switch 105 is closed to ST, namely the self-timer mode is selected, the transistor 65 is rendered non-conductive, whereby the condenser 101 is charged with the output of the latch circuit through the resistance 19. After the lapse of the time of the self-timer determined with the time constant of 19 and 101, the transistor 64 is rendered conductive, whereby the shutter control circuit 98 is actuated so as to carry out the photographing operation in the above mentioned way.

Below, the rewinding operation will be explained. When along with the above mentioned photographing operation, the film counter reaches a predetermined frame number of the loaded film, the switch 108 is closed. Thus, the transistors 53, 54 and 55 are rendered conductive, whereby along with the switching on of the transistor 55 of the transistor 74 is rendered conductive. Along with the switching on the transistor 74 the transistors 58, 56 and 60 in the driving circuit are rendered conductive, whereby along with the closing of the transistor 60 the transistor 70 is rendered conductive.

Further, along with the switching on of the transistor 53, the transistor 72 is rendered conductive, while thus the transistor 73 is rendered non-conductive. Consequently, the transistor 74 is kept in conductive, whereby a driving current is supplied to the motor 99 along the direction opposed to the arrow through the transistors 59 and 70 in such a manner that the motor is rotated along the inversed direction so as to carry out the rewinding.

When the film rewinding has been terminated, the switch 106 and also the switches 107 and 108 are opened so as to stop the rewinding operation.

Figure 4:
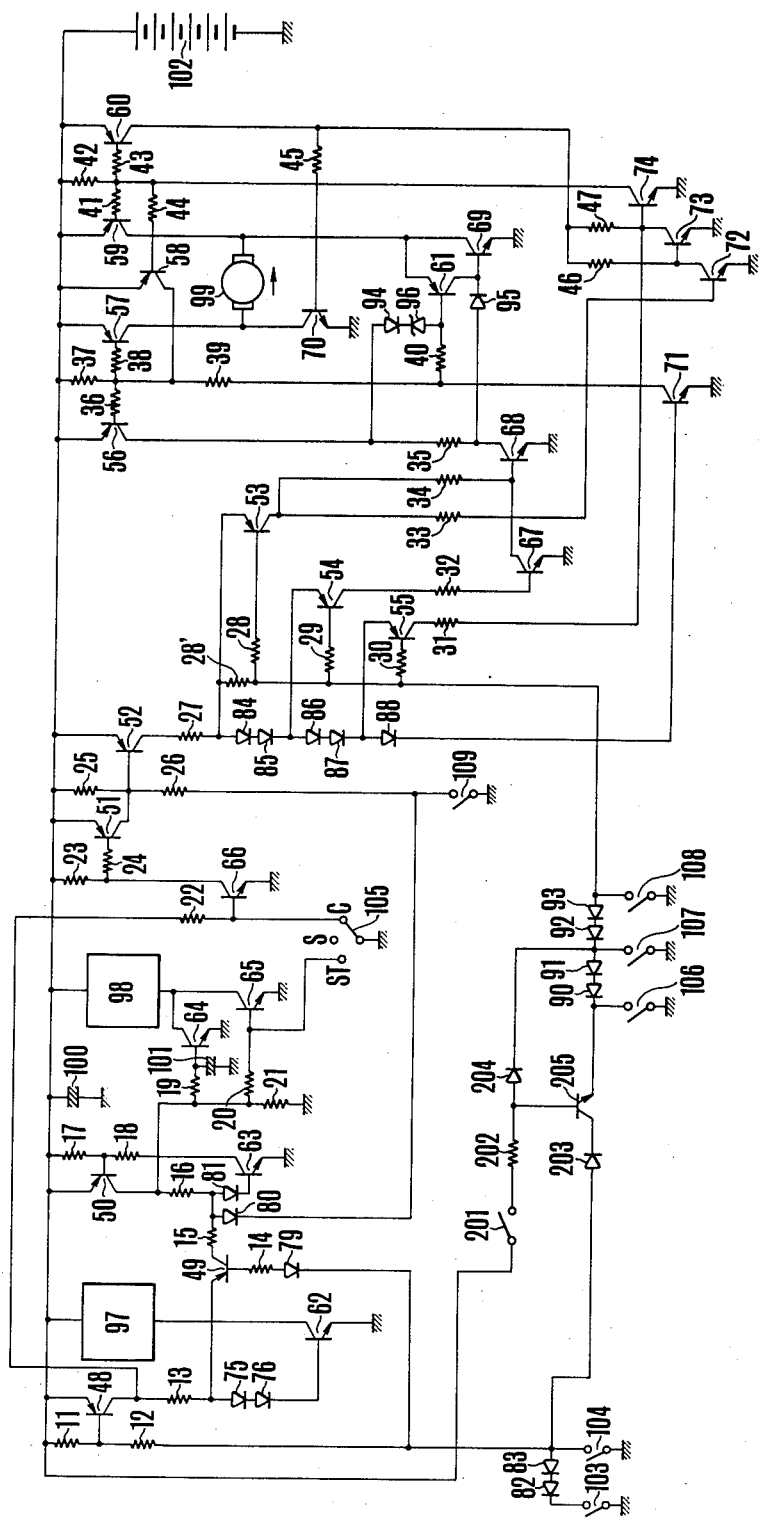
FIG. 4 shows another embodiment of the circuit according to the present invention.

Below, the second embodiment of the present invention will be explained in detail in accordance with FIG. 4. Hereby, the members having the same figures as those in FIG. 3 are the same members, so that their explanations are omitted here. In FIG. 4, 201 is the switch to be closed in response to the closing of the back cover of the camera, 202 is the base resistance, 203 and 204 are the diodes and 205 is the NPN transistor.

In case of the above second embodiment, when the back cover is closed after the film has been loaded, the switch 201 is closed in such a manner that a base current runs through the base of the transistor 205 through the switch 201, the resistance 202, the base emitter of the transistor 205 and the switch 106 so that the transistor becomes conductive. Thus, in case of the present embodiment the film is automatically wound from the position S up to the position 0. Hereby, other operations are carried out in the same way as in case of the first embodiment, so that their explanations will be omitted here.

As has so far been explained in detail, in case of the motor drive camera in accordance with the present invention, until the film is wound up to the photographing start position, a lower voltage than the normal one is supplied to the motor, which carries out the film winding up at a lower speed, so that no perforation damage during the initial film winding up takes place with the result that the film can automatically be wound up with sureness. Further, when the film has assumed the photographing start position, the film winding up speed is automatically changed over into the normal one. Further, the continuous photographing mode, the one frame photographing mode or the self-timer photographing mode can optionally selected by means of the photographing mode change over switch. Further, when the predetermined number of film frames have been exposed, the motor is automatically changed over into the rewinding mode so as to automatically carry out the film rewinding until the film has completely been rewound, whereby the operation is automatically stopped. Namely, all the operations are automatically carried out.

What is claimed is:

1. A film winding apparatus for a camera having a film, comprising:
    (a) a motor to wind the film; and
    (b) a driving means for supplying the motor with a signal to drive the motor in such a manner that the film is wound up at a normal speed between frames and at a lower speed than the normal speed from the film loading position up to the photographing start position.

2. A film winding apparatus for a camera having a film, comprising:
    (a) a film winding motor built in the camera; and
    (b) a driving means for supplying the motor with a signal to drive the motor in such a manner that the film is wound up at a normal speed between frames and at a lower speed than the normal speed from the film loading position up to the photographing start position.

3. A film winding apparatus for a camera having a film, comprising:
    (a) a motor to wind the film; and
    (b) driving energy supplying means for supplying the motor with one voltage between frames from the photographic start position and with a lower voltage until the first frame of the film reaches the photographing start position than the voltage to be supplied to the motor for winding up the film after the photographing start position.

4. A film winding apparatus for a camera having a film, comprising:
    (a) a motor to wind the film;
    (b) driving means for supplying the motor with a first driving energy having a first level and a second driving energy having a second level in sequence; and
    (c) a change over means for changing over the energy to be delivered from the driving means to the motor from the first driving energy level to the second driving energy level in response to arrival of the first film frame at the photographing start position.

5. A film winding apparatus for a camera having a film, comprising:
    (a) a motor to wind the film;
    (b) a driving means for delivering driving energy to the motor;
    (c) shutter release switch means for the camera;
    (d) second switching means to be brought into the effective state in response to the film being loaded into the camera;
    (e) a control means for energizing the driving means when the shutter release switch means has been actuated and the second switching means has been brought into the effective state;
    (f) a third switching means to be brought into the effective state when the film has been wound up to a photographing start position by the motor; and
    (g) a second control means connected to the driving means to increase the magnitude of the driving energy when the third switching means has been brought into the effective state.

6. A film winding apparatus for a camera having a film, comprising:
    (a) a motor to wind the film;
    (b) driving means for delivering driving energy to the motor;
    (c) first switching means in operative engagement with the back cover of the camera to be actuated in response to the closing of the back cover;
    (d) control means for energizing the driving means in response to the actuation of the first switching means;
    (e) second switching means to be brought into the effective state when the film has been wound up to a photographing start position by the motor; and
    (f) second control means connected to the driving means to increase the magnitude of the driving energy when the second switching means has been brought into the effective state.

* * * * *